March 1, 1966     J. M. WARMAN     3,237,928
CONTROL ARRANGEMENT FOR CONTROLLED ATMOSPHERE FURNACE
Filed Dec. 22, 1961
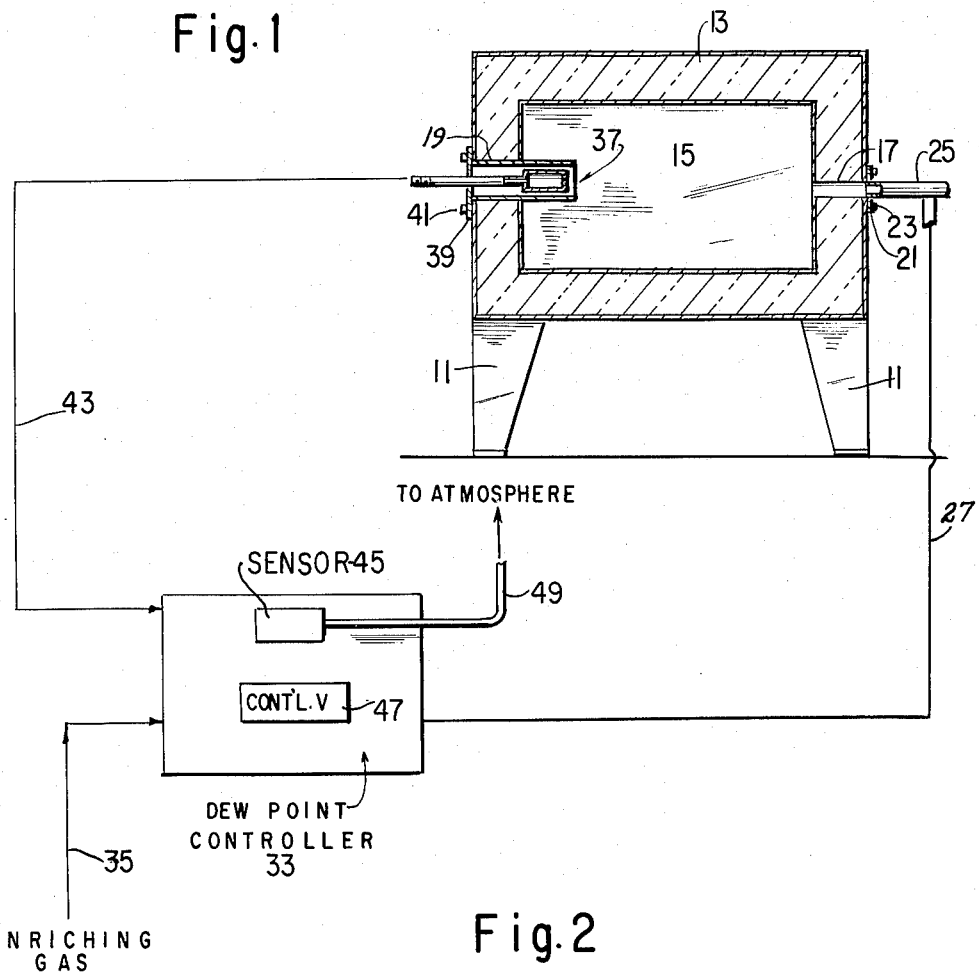
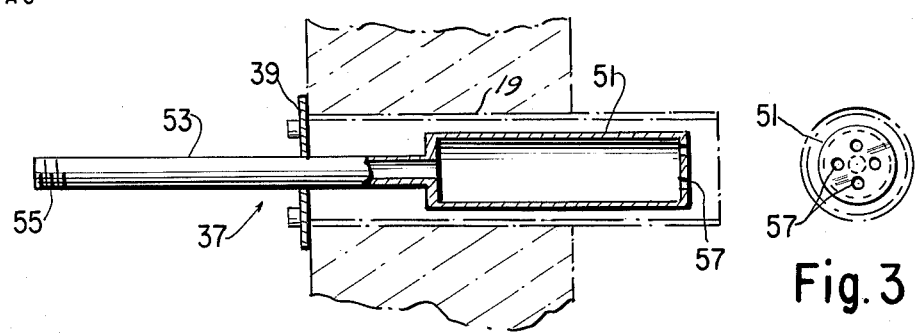
INVENTOR
JOSEPH M. WARMAN
BY
Robertson & Smythe
ATTORNEYS

United States Patent Office 3,237,928
Patented Mar. 1, 1966

3,237,928
CONTROL ARRANGEMENT FOR CONTROLLED ATMOSPHERE FURNACE
Joseph M. Warman, Oconomowoc, Wis., assignor to Basic Products Corporation, Milwaukee, Wis., a corporation of Wisconsin
Filed Dec. 22, 1961, Ser. No. 161,584
1 Claim. (Cl. 266—2)

The present invention relates to control of carbonitriding furnace atmospheres, and more specifically to a catalyst tube for removal of ammonia from gaseous control samples taken from carbonitriding furnaces.

Carbonitriding is a well known process in which steel products are exposed in a furnace to an atmosphere containing carbon and nitrogen to produce hard, wear-resistant surfaces. The process is performed at elevated temperatures, which may be in the range of 1400° F. to 1700° F., and in order to achieve best results of desired surface properties, it is important carefully to control the carbon and nitrogen content of the internal furnace atmosphere. The total amounts of carbon and nitrogen, as well as the ratio of carbon to nitrogen, must be maintained at proper levels within the furnace to insure that these elements are added in proper proportion to the surface of the steel product being treated.

This control of furnace atmospheres may be effected by automatic control instruments which are adapted to receive samples of the gases from within the carbonitriding furnace and regulate the input to the furnace in accordance with the condition of the gas samples received. The automatic control instruments may be comprised of a sensor element and a control element, the control element being operative to regulate furnace input, and the sensor element being operative to make this regulation responsive to the sensed condition of the sample gases.

Until now, control of carbonitriding furnace atmospheres has been by manual means due to the fact that sensor elements of current automatic control instruments cannot tolerate ammonia gases present in the samples taken from the furnace interior. These sensor elements are generally of the dew point type since others are too expensive to wararnt serious consideration, and it is well known that electrical conductance cells, condensation cells, and wet bulb-dry bulb cells are extremely sensitive to amomnia gases. The ammonia dissolves onto the cells radically changing their calibration characteristics and rendering them useless. Additionally, the cells are usually constructed of materials which are rapidly corroded by ammonia gases.

One of the objects of the present invention is to provide a catalyst tube for dissociating ammonia in the gases flowing from a carbonitriding furnace.

Another object is to provide an improved arrangement of apparatus including a catalyst tube for automatically regulating the carbon and nitrogen content of the atmosphere within a carbonitriding furnace in a simple and inexpensive manner.

In one aspect of the invention the aforementioned difficulties are overcome by providing a special catalyst tube for dissociating ammonia in the sample gases flowing to the automatic control instruments. The tube contains a catalytic material operative to dissociate ammonia from the sample gas and, after the dissociation process, the flow area within the tube is decreased thereby increasing flow velocity of the ammonia-free gas to prevent reassociation of the dissociated ammonia.

Other objects, features and advantages of this invention will become apparent by reference to the following detailed description considered in connection with the accompanying drawings, such being merely exemplary.

FIG. 1 is a schematic view of a carbonitriding furnace and a control system therefor;

FIG. 2 is a side view partially in section of the catalyst tube of the present invention; and FIG. 3 is a right end view of the catalyst tube shown in FIG. 2.

Referring to FIG. 1, there is shown a carbonitriding furnace supported upon upstanding legs 11 and having walls 13 formed of any suitable heat-resistant material enclosing a furnace interior 15. The walls 13 are provided with openings 17 and 19 which communicate with the furnace interior 15. A plate 21, affixed to the outer surface of wall 13 by any suitable fastening means 23, surrounds the opening 17 and provides support for a gas inlet tube 25. The tube 25 provides the furnace interior 15 with the enriching gas, ammonia gas and carrier gas necessary for the carbonitriding process.

The tube 27 which carries the enriching gas extends from a dew point controller 33 to tube 25. The enriching gas is comprised of carbon and nitrogen and the amount thereof flowing to the furnace interior 15 is regulated by the dew point controller 33 in a manner to be hereinafter described. A tube 35 provides for flow of enriching gas from a source thereof (not shown) to the dew point controller 33.

The opening 19 has positioned therein a catalyst tube, generally indicated by the numeral 37, supported by a plate 39 which is affixed to the outer surface of wall 13 by any suitable fastening means 41. Sample gas leaving the furnace interior 15 passes through the tube 37 and is transmitted to the dew point controller 33 by means of tube 43. The catalyst tube 37 operates to dissociate ammonia from the sample gas passing therethrough, as will be hereinafter more fully explained, and the dew point controller 33 senses the condition of the ammonia-free gas and regulates the flow of enriching gas in response thereto.

The dew point controller 33, which may be of any well-known commercially-available type, comprises a sensor element 45 and a control valve 47. The ammonia-free gas passing through tube 43 flows through the sensor element 45 and is vented to the atmosphere by means of a tube 49. The sensor element 45 senses the condition of the sample gas passing therethrough and effects operation of the control valve 47 to regulate the flow of enriching gas to the furnace interior 15 in accordance with the sensed condition of the sample gas. The dew point controller 33 may be calibrated to automatically effect a desired regulation of the carbon and nitrogen content of the furnace atmosphere dependent upon the steel surface effects desired. Once calibrated, the controller 33 will automatically and continuously maintain a desired carbon and nitrogen content within the furnace, sensing any change by means of sensor element 45 and controlling the flow of enriching gas to overcome the change by means of control valve 47. It will therefore be apparent that the carbonitriding process may be automatically carried forth to achieve best results of desired surface properties.

As has been stated, until now, dew point controllers could not be successfully used in the carbonitriding process due to the adverse effects of ammonia on the sensor elements. The catalyst tube of the present invention provides for the dissociation of the ammonia from the sample gas, thereby permitting regulation of carbonitriding furnace atmospheres in a simple and inexpensive manner. The structure and operation of the catalyst tube will now be described.

Referring to FIGS. 2 and 3, the catalyst tube 37 is comprised of two adjacent tubular sections 51 and 53. The tubular section 51 has a larger diameter which may be in the order of 2 inches, while the smaller diameter of section 53 may be in the order of ¾ inch. The left end 55 of section 53 is threaded, thereby permitting connection of suitable fittings, and section 53 may extend through plate 39 to the exterior of the furnace. The right end of section 51 contains openings 57 which permit the flow of gas therethrough. The catalytic material for effecting the dissociation of ammonia is placed within tubular section 51 which is positioned to extend within the furnace interior 15. In this manner, heat from the furnace is applied to the catalyst to effect the desired catalytic reaction.

Gases from the furnace interior flow through the openings 57 and into the tubular section 51 containing the catalyst. The heated catalyst acts upon the gases to dissociate the ammonia therefrom, and the ammonia-free gases then flow into tubular section 53. Due to the decreased flow area of section 53, the velocity of the ammonia-free gases is increased and reassociation therewith of the dissociated ammonia is prevented. The ammonia-free gases then flow to the tube 43 and into the sensor element 45.

In the operation of the process, it has been found that best results are achieved when type 446 chromium-iron alloy, which contains 23 to 28 percent chromium with remainder iron is used as the catalyst. With this material, ammonia dissociation rate increases with increased temperatures and a very high dissociation rate is produced at a temperature of approximately 1200° F. As has been stated, the carbonitriding process may be performed by temperatures in the range of 1400° F. to 1700° F. Therefore, utilization of the catalyst tube of the present invention avoids the necessity of a separate heater for the catalyst since this may be accomplished directly in the carbonitriding furnace.

In addition to type 446 chromium-iron alloy, other materials, such as copper shavings washed in dilute $H_2SO_4+HNO_3$, or aluminum foil-balls, may be used as the catalyst. However, it has been found that these materials are not as effective as the aforementioned chromium-iron alloy, and although their dissociation rate increases with increasing temperature, said chromium-iron alloy gives a higher rate for a given temperature above 1000° F.

From the foregoing, it will be apparent that the present invention substantially simplifies the effective control of carbonitriding furnace atmospheres, and materially reduces the expense thereof due to the fact that dew point type instruments may be utilized. Additionally, ammonia removal from sample gases is now possible by apparatus which may be simply and inexpensively manufactured.

It should be understood, of course, that the foregoing disclosure relates to only a preferred embodiment of the invention and that numerous modifications and alterations may be made therein without departing from the spirit and scope of the invention as set forth in the appended claim.

What is claimed is:

In carbonitriding apparatus including a furnace, an inlet in said furnace for ammonia and carrier gas, and control means automatically effecting regulated input of carbon and nitrogen to said furnace through said inlet, said control means operative to sense the condition of samples of said furnace gas and effect said regulated input in response thereto, the combination comprising flow path means forming a gas sample flow path from said furnace to said control means, a catalyst in said furnace and in said flow path for dissociating ammonia in said samples, said flow path means having a reduced flow area external of said furnace to increase the flow velocity of said samples after dissociation of said ammonia whereby reassociation to ammonia is substantially prevented and said control means having a sensor of the dew point type sensing the catalyst-treated gas samples.

References Cited by the Examiner

UNITED STATES PATENTS

| | | | |
|---|---|---|---|
| 2,721,788 | 10/1955 | Schad | 23—288 X |
| 2,799,159 | 7/1957 | Sabol | 23—255 X |
| 2,802,725 | 8/1957 | Kappel | 23—281 |
| 3,011,873 | 12/1961 | Davis. | |
| 3,025,145 | 3/1962 | Terpenning | 23—288 |
| 3,057,693 | 10/1962 | Barnes et al. | 23—254 X |
| 3,128,323 | 4/1964 | Davis | 23—255 X |

FOREIGN PATENTS

| | | |
|---|---|---|
| 587,892 | 12/1959 | Canada. |
| 592,113 | 2/1960 | Canada. |

MORRIS O. WOLK, *Primary Examiner.*